INVENTORS
SVEN ERIKSSON
BY BÖRJE NYQUIST
Samuel [signature]
ATTORNEY

United States Patent Office 3,327,292

Patented June 20, 1967

3,327,292

RACE TRACK BETTING DATA HANDLING SYSTEM

Sven Eriksson and Börje Nyquist, Goteborg, Sweden, assignors to Swedish Computer AB, Goteborg, Sweden Filed Sept. 11, 1962, Ser. No. 222,921
Claims priority, application Sweden, Sept. 12, 1961, 9,064/61; Mar. 3, 1962, 2,354/62
10 Claims. (Cl. 340—172.5)

Figure 1:
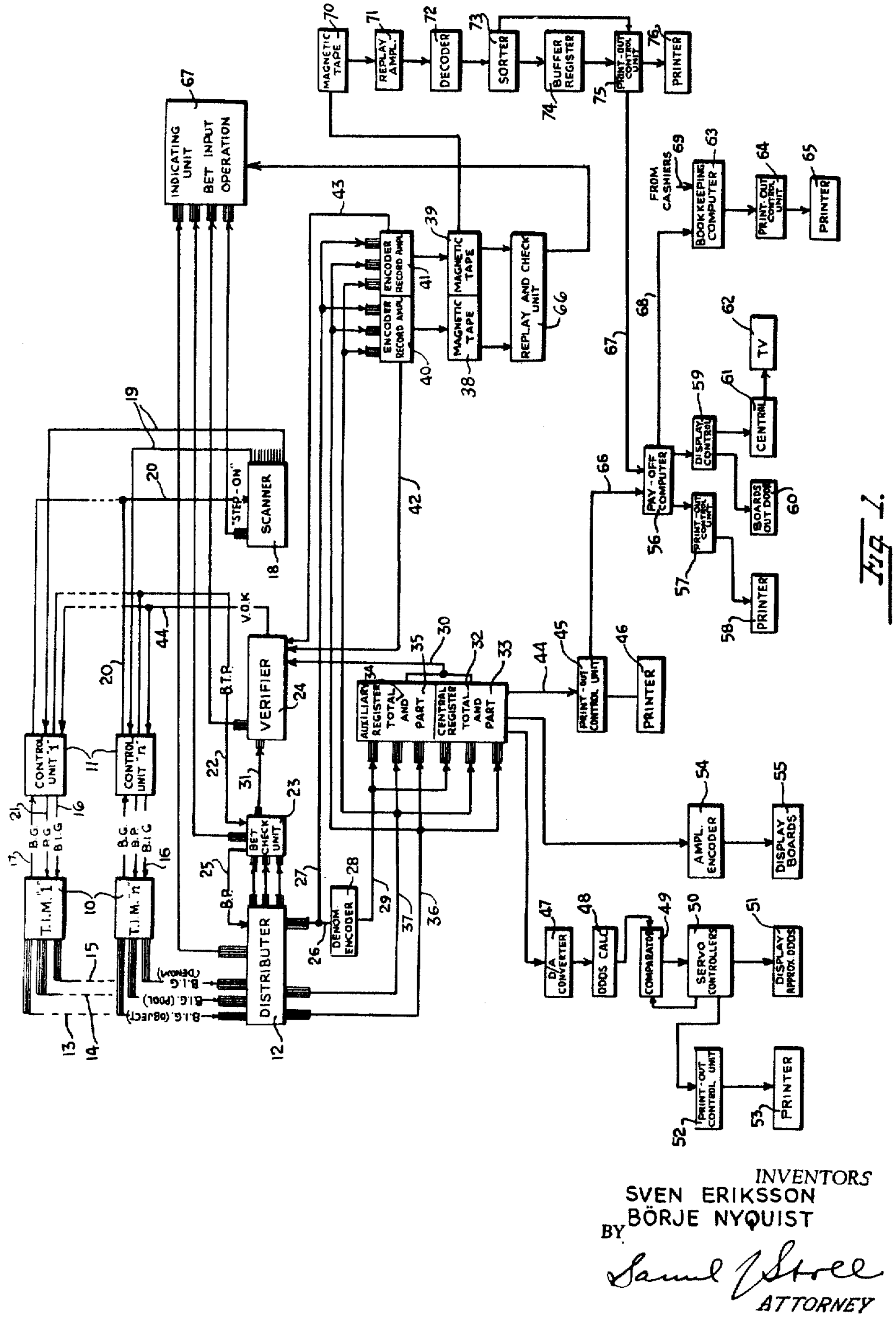

This invention relates to electronic data handling systems. More particularly, it relates to an improved electronic integrated data handling system, which is especially adapted for handling race track information.

As is well known, the amount of race track information, which must be processed before a race, may be very large and the time for processing it is usually very short. As a consequence, large numbers of highly trained people in a closely supervised organization may be required if the information is to be processed manually. Recently, electronic computing apparatus has been installed at many race tracks for automatic processing of betting information. In general, this apparatus has been provided in functional units and sub-units, which operate in place of previous human functional groups or sub-groups in the information processing chain.

Such apparatus works very well for its intended purpose. But it has also proven to be very costly to install and operate. This has been an especially disadvantageous factor where only portions of a system have been automated and the expenses of maintaining at least a portion of a skilled tote staff must also be carried. In addition, of course, human error factors are not completely eliminated in such circumstances and the automatic features present may not function to full advantage.

The purpose of this invention is to provide a fully integrated data handling system for automatically processing all race track betting information including various kinds of combined betting such as "daily double" and "quinella." Still another purpose is to provide a multiunit ticket issuing system which operates to effect delivery of tickets at any individual ticket issuing machine without noticeable waiting time. Yet another purpose is to incorporate in the data handling system means for identification of possible errors and for correcting such errors so that no errors will appear in the end result and there will be a minimum of delay in the sale of tickets as a result of any malfunction of any unit of the data handling system.

Another purpose of this invention is to provide such a system with a minimum of units and sub-units so that equipment cost is low and installation and maintenance can be readily performed. Still another purpose of this invention is to provide such a system wherein the information fed into it is positively checked for accuracy.

Yet another purpose of this invention is to provide such a system in which the only human operating function required is that of selecting the wager to be placed.

According to an embodiment of this invention, a large number of input units or ticket issuing machines, such as for example, 500, may be used. Each ticket issuing machine is provided with sufficient selector circuits so that a patron need visit the location of only one machine, irrespective of the bet he desires to place. Thus, at each machine, a selection of the runner or betting object, amount of a bet to be placed on that runner, and its winning position, such as win, place or show, may be made.

If, at a particular place or track, an operator is desired, the input units may conveniently have a key or button arrangement for actuating the circuits corresponding to a selection as soon as a bet is paid. Or, more conveniently, the selection may be by the patron himself, where an operator is not necessary, and the circuits actuated upon insertion into the machine of coins or tokens corresponding to the amount of the bet to be placed. If a particular organization prefers to group ticket machines according to betting amount, the corresponding amount selectors at the ticket issuing machine may be omitted. Of course, a similar grouping may be arranged regarding a pool, whereby separate pool selectors will no longer be necessary.

As soon as a bet is placed, the machine operates to produce a ticket or receipt on which appropriate bet information is printed, and also to preclude the placing of another bet for a fraction of a second until the first bet has been processed into the system.

In this embodiment of the invention, a control unit is provided for each of the input units. The individual control units are conveniently located remotely of the ticket issuing machine, at, say, a central station or control center.

An electronic scanning unit is provided at the control center to inspect serially each control unit and determine whether a bet has been placed on the corresponding ticket issuing machine or not. If no bet has been placed, the control unit omits a signal which causes stepping of the scanning unit in the serial inspection. If a bet has been placed, stepping of the scanning unit is precluded until all of the bet information has been registered in the system.

An input bet check system is also provided. This incorporates sensing and comparing circuits, which have the function of checking information which is to be registered as a bet. In this way possible errors due to short circuits or similar defects at the cables, connectors, etc. are excluded.

Furthermore a verifying unit is included in the control center. In the verifier the information which is to be registered, is temporarily stored and compared with the same information which has been properly coded and which has passed the input circuits of the registers. In addition the verifier receives signals from the encoders at the magnetic tape units as soon as the information has been recorded on the tape. If the information transmitted through the register input circuits corresponds with the original information, which is fed directly to the verifier, and if the signals from the tape recorders are received properly, the verifier transmits a pulse to the control units. The particular control unit, associated with the ticket issuing machine at which the bet was placed, will then release the printing mechanism and the ticket is automatically produced. After printing, the circuits of the ticket issuing machine are reset so that the machine is ready to receive a new bet.

A distributing unit is also provided in which gate circuits responsive to the various input signals are set up to direct coded betting amount signals to the different registers and tape recorders as well as to an input check unit. If the information arriving at the input bet check units is correct, the bet unit pulse is then distributed via a denomination encoder to the registers.

The main elements of the registration circuits, having now briefly been mentioned, the operation of the different units will be described as follows:

When the scanners in the serial inspection find the control unit associated with the ticket issuing machine on which a bet has been placed, a bet identification gate signal is transmitted in two directions: one through the circuits of the ticket issuing machine to the distributor and one to the bet input gate check unit, which immediately transmits a bet pulse through the gates at the distributor on to the denomination encoder. The coded information is then fed to the auxiliary and central registers. Simultaneously the bet pulse is fed to the tape recorder units where separate encoders transform the betting amount information into a suitable form for registration on the magnetic tape. When the amount has been properly registered and the registering has been confirmed by the verifier, the verifier produces a "clear" signal to the control unit, which then produces a print out pulse, going to the ticket issuing machine and thus issuing the ticket, and another stepping pulse to the scanner. When the scanner has received this stepping signal, it advances one more step to inspect the next control unit, which will immediately produce another stepping pulse if no bet has been placed on the corresponding ticket issuing machine. In this way the scanner continues to inspect one control unit after the other, each scanning step taking only a small fraction of a second and the complete inspection cycle for a large number of machines can be performed within a sufficiently short time.

The distributing unit is provided with gating means responsive to the pool and runner signals so that the bet amount pulses are transmitted to the central registers. There, the amount of the bet for each object in each pool is maintained. Also the amount of the bet is entered in a total pool register so that a running total of all bets in each pool is maintained. And, as mentioned, the bet amount pulses are also transmitted back to the verifier where the amount of the bet represented by the pulses is compared with the information from the Input Bet Check Unit. If the digital information is identical when compared in the verifier a "clear" signal is transmitted to the control units. If the information is different an alarm circuit is actuated and the error and its location are shown on panel lights. The faulty units, may be disconnected and the scanning program can be manually started again.

Also, circuits are provided from each runner register and from each pool register to a digital/analog converter from which signals are taken to a ratio computer. Here, appropriate quantities, such as, for example, an amount for overhead or for taxes, may be automatically deducted and the odds continuously computed. A digital pay-off computer is also provided giving the final pay-off prices.

Servo devices are also connected to the registers and to the odds computer as well as the pay-off computer for controlling display boards, and desired information, such as odds on each runner in each pool, and total amounts in each betting pool may be continuously and promptly transmitted to all viewing locations.

Additional components which may be included in this embodiment include printer converters to take the stored counts from the central registers as well as signals from the odds computer and transmit corresponding actuating pulses to printing machines so that written records of stored counts and calculated odds can be produced. Auxiliary registers may also be installed, identical with the central registers but provided with display glow tubes or lights, so that accumulated totals in the memory circuits may be visually inspected at any time. And also provided, of course, are reset circuits for clearing all information from the system after each race, and a central operator console at which suitable indicators, alarms, test plugs and controls for manual operation as may be desired from time to time.

Integral parts of this embodiment may also be magnetic tape recorders with associated encoders and recording amplifiers, which store information about every wager. The same tape recorder unit, or if considered more convenient, a separate magnetic tape unit is provided with replay facilities, decoder and sorter circuits as well as means for operation of a printer and for providing output signals to a pay-off computer. In this way statistical facts as well as necessary information to calculate pay-off prices of combined betting can easily and automatically be extracted from the record on the magnetic tape.

Other components and features of this invention are automatic change of ticket paper rolls in the ticket issuing machine, two paper rolls in each ticket issuing machine, a punching device at each ticket issuing machine for punching a paper tape at each bet, an automatic sale record printer at the ticket issuing machine, central locking of the ticket issuing machine, central change of code symbols and race numbers and blocking facilities for not starting horses.

An input device for off-course betting is also included.

A display for the cashiers and, as an ultimate link of the integrated data handling system, a bookkeeping computer making a complete record of all money transactions for every race over a period during which payment for winning tickets have to be made, may also be provided.

These and other features of the invention are described in further detail in the following portion of the specification.

In description which follows, reference is made to the accompanying drawing in which:

FIGURE 1 is a block diagram showing the arrangement of principal components according to one embodiment of the invention and illustrating the operative relationships between the several components.

In FIGURE 1, ticket issuing machines, which shall hereafter be abbreviated T.I.M., are indicated at 10. As previously mentioned, there may be a large number of such machines at a race track. The number of T.I.M. which may be installed in this invention is limited only by race track requirements. But, since with this invention any bet in a race may be placed at any T.I.M., the number of machines required is ordinarily substantially less, other factors being equal, than the number of betting stations or windows in previous manual or semi-automatic tote systems. However, with this invention, spacer requirements for a betting station are minimal and T.I.M.'s may be placed at any convenient location about the viewing areas of a race track. It is, therefore, not necessary with this system to require a patron to walk a great distance from his viewing place to find a bet station and place his wager. This convenience factor may tend to increase the amount of betting so that the number of T.I.M.'s ultimately installed at a race track may exceed the previous number of betting stations there.

In the drawing, machines 10 are indicated as T.I.M. "1" and T.I.M. "*n*" to show that there are more than two T.I.M.'s in a typical installation.

Each T.I.M. is provided with pool, runner and amount selector means. The selector means may conveniently have a key board or a button panel for manual actuation. Where local practice or agreement requires an operator, the operator would operate the key or button selectors after a bet is paid. Otherwise, the T.I.M. may be adapted for operating by a racing patron himself much in the style of a vending machine. In such a case, means for receiving coins or tokens corresponding to the amount of a bet are provided. After the patron has selected his betting object, the runner, for a race, the pool or winning position, i.e. win, place or show, and the amount to be wagered, insertion of his coins or tokens will actuate the T.I.M. for registration of his bet in the data handling system.

Printing means are also conveniently provided in the T.I.M. so that a ticket on which appropriate wager data is imprinted to the patron after he paid his bet. With this invention, the ticket is not produced until data corresponding to the placed bet has been properly transmitted and counted in the central registers and the tape recorders. After that, a fraction of a second later in normal operation, the ticket is issued and the T.I.M. is cleared and reset to receive the next wager.

A control unit 11 is provided for each T.I.M. in the system. Each control unit is conveniently located remotely of its T.I.M. at, say, a central control or operating room where other principal components of the system are positioned. It is then connected to its T.I.M. by appropriate circuits, as described below.

A set of common circuits or leads 13 are provided for connecting each T.I.M. to a distribution unit 12 in the control or operating center. There is one runner lead for each betting object or runner which may be selected. Each T.I.M. has electrical contacts arranged so that actuation of the runner selector means (at the T.I.M. in which a bet is placed) operates to connect the runner circuit corresponding to the betting object to the T.I.M.

A set of betting amount circuits or leads 15 are connected between each T.I.M. 10 and the unit 11. In each set there is one amount lead for each monetary amount, such as, for example, $2, $5, $50 and $100, which may be selected. Means are also provided in each T.I.M. so that when an amount has been selected and a bet paid, a signal voltage is impressed on the corresponding amount lead to the distribution unit.

A set of pool circuit leads 14 are connected in similar fashion between each T.I.M. 10 and the distribution unit. Means are also provided in each T.I.M. so that when a pool has been selected and a bet paid, a signal voltage is impressed on the corresponding pool lead to the distribution unit.

Between each T.I.M. 10 and its control unit 11, a bet identification gate lead 16 is connected.

A "bet gate" lead 17 also connects each T.I.M. with its corresponding control unit. Another lead 21 between the T.I.M. and its control unit is provided for carrying the print out pulse (P.P.).

An electronic scanner unit 18 is provided at the operating location for serially inspecting each control unit 11 to determine if a bet is waiting to be registered in the system. There are several types of well known circuits, which may be used for this function. Preferred is an arrangement where each control unit by means of suitable "and"-gates will respond to the decimal output signals of an electronic counter. A particular control unit thus will receive an interrogating pulse, if that unit receives digital output signals from a counter corresponding to the number allocated for the control unit in question, defined by the gate arrangement. By using this type of scanning there are 10 leads each for each digital position connecting the counter at the scanning unit with each control unit. For numbers up to 999 a maximum of 30 leads, of the type indicated by the numeral 19 will be required. The counting circuit of the scanner will receive step-on signals from the control units as described earlier (lead 20).

Each control unit 11 is provided with a logic circuit arrangement so that if no "bet gate" signal (lead 17) is present, from a T.I.M. 10 the circuit responds to the interrogating pulse and transmits a "step-on" pulse (lead 20) back to the scanner unit 18. The lead 20 is common to all control units and connects the control units to the counting circuit of the scanner. Thus when a pulse is received back from the control unit the scanner is advanced or stepped to the next control unit arranged for the next number of the counting, and the cycle repeats for the subsequent control unit.

On the other hand, if a bet has been placed on a T.I.M. and is waiting to be registered a B.G. voltage signal will be present in that T.I.M.'s control unit when it is interrogated or scanned. In this event, the control unit logic circuitry is responsive to both the interrogating pulse and the T.I.M. signal and emits two signals one of which we shall call the bet identification gate, and abbreviate B.I.G. The other we shall call Bet Trigger Pulse and abbreviate B.T.P.

The B.I.G. is transmitted from the control unit 11 being scanned over lead 16 to its related T.I.M. 10. In the T.I.M. the bet identification gate is routed to the one lead in each of the object, pool and denomination sets of leads 13, 14 and 15 to which the T.I.M. is then connected, as has been described, and on to the distribution unit 12. Thus, a B.I.G. provides runner of betting object information, pool information and denomination information at the distribution unit, because only one lead in each of the common sets of leads 13, 14 and 15 have a signal, and that lead is the one corresponding to respectively the betting object chosen, the pool and the betted amount.

The bet trigger pulse (B.T.P.) is transmitted through a lead 22, which is common to all control units, to the bet check unit 23.

In the input bet check unit 23 the bet information—object, pool and amount, is checked for correctness, insuring that only one lead in each set of leads—object, pool and denomination—is carrying a voltage signal. If this information is correct the bet trigger pulse will pass through the circuits of the bet check unit through lead 25 to the distributer where a gate is already open, corresponding to the betted amount. The pulse passing through 25 and the distributer 12 may be called betting pulse (B.P.) and is transmitted further along two leads, one 26 to a denomination encoder and another 27 to the encoders for the magnetic tape recorders. In the denomination encoder 28 a voltage present on one of the amount leads is transformed to a suitable coded information, which is then brought through lead 29 to the input of the registers. At the binary-decimal registers the information is introduced either at the units, tens or hundreds position whereby the amount 2 is represented by one pulse at the second binary stage. The amount 5 similarly is represented by 3 pulses, one pulse at the first binary stage and 2 pulses at the second binary stage. The same pulses are routed through the input circuit of the registers and through lead 30 to the verifier where two counting circuits are actuated one for the first decade and another for the second decade and so on. The DC output from these counters is compared with the signals already present as DC voltage coming from the bet check unit through lead 31.

The registers are central total registers 32, central part registers 33, auxiliary total registers 34 and auxiliary part registers 35. The amount information, as described, is routed to the proper total and part registers by means of gate signals transmitted through a set of leads 36 for object and 37 for pool. In this way the amount is counted in the proper total and part registers. At the same time as a bet is registered in the central and auxiliary counting registers, the bet is also recorded on two magnetic tape units 38 and 39 operating in parallel. Before the information is registered the bet signals are encoded and amplified in the units 40 and 41. The encoder circuits are arranged in such a way that the information going to the tape is converted to binary form and so that it can be checked for parity. If the information which is going to be registered on the tape is correct, a clear signal is transmited through leads 42 and 43 to the verifier.

Supposing now that the information has been properly recorded in the counting registers as well as at the magnetic tape units, a number of voltage signals will be present at the input of an "and"-circuit in the verifier 24. The presence of voltage on all inputs of the verifier "and"-circuit results in an output signal from the verifier (V.O.K.), indicating that the registration is made and found to be correct. The V.O.K. signal is transmitted through a lead 44 connected to all control units. When a pulse arrives at that particular control unit, which belongs to the T.I.M. at which the bet was placed, the control unit produces two output pulses, one through lead 21 to actuate the print out mechanism of the T.I.M., and another through lead 20, the "step-on" signal to the scanner.

From this description it is obvious that the scanning is determined by interrogation signals going out and answer signals received back and not by a fixed frequency signal produced by a pulse generator or an oscillator.

The information recorded on the magnetic tape is continuously replayed and processed into a check unit 66 where it is checked for parity. Furthermore the information on the two tape recorders, operating in parallel is compared.

If the information is correctly recorded, the tape recorders as well as the complete data handling system proceeds in its operation. If, on the other hand, the check unit indicates some error in the recording, the check unit transmits a warning signal to an indicating unit 67. This unit will show on panel lights the kind of malfunction as well as the location of the unit not operating correctly. Leads are brought to this unit from the distributer 12, the bet check unit 23, the verifier 24, the scanner 18 and the tape recorder check unit 66.

For the arrangement of FIGURE 1 the central total register 32 has a counting circuit for each betting pool and records the amounts bet in each pool for each race. The central part register 33 has a counting circuit for each betting object or runner in each pool. Other counting circuits may be provided as desired or, for example, the show pool circuit may be eliminated in some installations.

Auxiliary registers shown at 34 and 35 are provided for parallel operation with the control register. Each auxiliary register is identical with the corresponding central register except that the information is only indicated on suitable indicating tubes. The auxiliary registers, of course, also receive their input pulses from the distributing unit 12 so that both total registers and both part registers should at all times contain the same information. Auxiliary registers are not essential but are normally incorporated as described as a safety or reliability measure. In case an error should develop in the central registers the auxiliary registers provide a further checking facility.

The central register counting circuits have output circuits from which the total counts in each register may be periodically or on demand transmitted to other parts of the system. This may be done by a gating system, controlled by an electronic counter, which sequentially opens the gates at the counter outputs so that the digital information can be transferred to a set of intermediate memories or to the control unit for the print out mechanism. In this way the total count in each register can be transmitted for print out, odds calculation and display.

As previously described every bet is recorded on two magnetic tape units operating in parallel. This mode of operation is preferred in order to obtain additional safety in case the magnetic tape should be defective and produce an error. Such an error can easily be found and corrected by comparing the two records. After each race the information on the tape is replayed on the magnetic tape unit 70, which may be one of the units for recording or more conveniently a separate unit used only for replay purposes. The signals from the magnetic tape unit 70 are amplified by a set of replay amplifiers 71 and brought to a decoder unit 72. In the decoder the original binary information is transformed to decimal code. After the decoder the replay system has a sorter 73 by means of which the required information such as all bets for any two combined objects can be extracted and fed to the buffer register 74. From this register the accumulated counts are brought to the print-out control unit 75 which operates a printer 76 producing a printed record of the sales. At the same time as the information is printed, it can also be transferred through lead 67 to a pay-off computer 56. Alternatively a punched paper tape produced simultaneously with the printing can be used to transfer the information to the pay-off computer where it is processed by well known digital computer technique to give pay-off prices on winning combinations at combined betting.

For print out, lead 44 is connected to a print-out control unit 45, which comprises the necessary control decoding and programming circuits as well as power circuits for energizing solenoids in a digital printer 46. With the print-out unit, permanent records of betting data can be provided.

For approximate odds computation the information contained in the control total register is continuously fed to a *D/A* converter 47, although the transmitted information may be limited to predetermined number of significant bits. This is to avoid the necessity for carrying an excessive number of insignificant bits through the computation. The central part registers are scanned in sequence by means such as counter operated gates, and their information is also fed to the *D/A* converter 47. In both cases the digital information is converted to voltages which are transmitted to the odds calculator or ratio computer 48. The calculator 48, computes the ratio between the voltage representing the digital information in one of the central total registers and the voltage representing the digital information in one of the central part registers, applies predetermined correction factors for, for example, taxes or "take-off" as may be prescribed by law, and produces at its output a voltage representing the odds to be displayed.

This voltage is then fed to comparator and servo-controller units 49, 50. Unit 49, the comparator, examines the voltage representing the odds presently being displayed and compares that voltage with the newly computed voltage for that particular betting object. If these two voltages differ, the comparator provides a signal to the servo-controllers 50, which then correct the display on panels 51 in accordance with the last computation. As soon as this is performed, the odds calculator 48 is ready for the next signals from the central registers.

Some race track organizations in addition to the approximate odds also wish to indicate on boards the amounts bet on the different betting objects in each pool as well as the totals of each pool. For this purpose the output circuits of the counting decade of the central registers 32, 33 are also connected to an amplifier and encoder unit 54 which supplies power to numerical display boards 55.

From the print-out control unit 45 all information being printed regarding bet amounts on each object in each pool as well as the total amounts in each pool, are also brought to a pay-off computer 56. This computer calculates the pay-off prices to be paid for each winning ticket for the different denominations, the commission, breakage etc.

The said information may be transferred to the computer simultaneously with the printing process through lead 66, or by means of a punched paper tape produced by a punch attached to the printer.

From the pay-off computor the final odds and the pay-off prices are fed to a display system 59 incorporating outdoor indicating boards 60 and a central display board 61 in the control room. The figures on the central display board are immediately made visible at the cashiers' windows by means of a closed loop TV-system 62.

Data computed by and stored in the pay-off computer may also be fed into a book keeping computer 63. This computer operating according to well known digital techniques is also provided with input units for recording the amounts paid out on winning tickets by the cashiers.

In this way the book keeping computer can be arranged to keep a complete record of all monetary transactions accruing in the operation of the tote organization for any desired period of time or as prescribed by law. From the book keeping computer 63 printed records may when required be extracted by means of a printer 65 and its associated control unit 64.

Reset circuits are provided in the various components as necessary, to return them to a normal state between transmission of the bets to be registered. The circuitry for generating reset pulses before each bet is straightforward and includes connections to the control unit under interrogation, the distributer unit 12, the bet check unit 23 and the verifier 24. These pulses may, conveniently be automatically obtained from "B.T.P." lead 22.

In addition, system reset circuits are also provided for clearing the entire system after each race. Operating stations for system reset may be provided at, for example, the judge's stand and the control center.

A control console, as mentioned previously, is provided for monitoring operation of the system. Devices such as operating and alarm indicators, test plugs and controls including reset controls, for operating the system manually, as may be desired from time to time, may be provided at the console.

The control console is also provided with means for remote change of race number and code symbols at the T.I.M., central locking of the T.I.M. and for releasing a pulse for automatic printing of a sale's record at each T.I.M.

In addition the control console may have means for introducing, before each race the off-course betting To prevent bets from being placed on non-starting entries, the control console is also provided with blocking switches, blocking the cancelled entries.

In this invention several of the functional units are of entirely new design, while other units are provided with important improvements to better suit their purpose and to permit reliable operation. Especially in the T.I.M. several fundamental improvements have been incorporated not found in other similar devices. These features include a mechanically linked paper tape punch for a permanent record at each T.I.M. of every ticket produced, a device for automatic change over from one paper roll to a second when the first has been consumed, thus extending the capacity of the paper magazine, a device for remote change of race number and code symbols at the printing mechanism, a device for automatic printing after each race, of the number of tickets produced by each T.I.M., a device for remote locking of the T.I.M. paper magazine and inspecting doors, so that the interior of the T.I.M. is accessible only at prescribed time when it can be opened by the supervising personnel.

For printing the amounts recorded in the central total and part registers as well as the information extracted from the magnetic tape, an electrically operated adding machine is normally provided. This print-out device is used for a final checking of the sums accumulated in the total and part registers at the same time as the sums are printed. This checking is conveniently made by first entering the counts of the central total register "none add" and thereafter each sum in the part registers with the machine adding at the same time as it is printing. When the numbers in all part registers have been printed the "total" key is actuated and the added total of the part register numbers is obtained. This total can then easily be compared with the total first printed, representing the counts in the central total register.

The invention is herein disclosed and described with detailed reference to a particular embodiment thereof so that it may be understood by those skilled in the art. It is to be understood that variations and changes may be made in the system described without departing from the spirit and scope of the invention. That scope is defined by the claims which follow:

We claim:

1. In a data handling system for automatically classifying and processing information items of preselected amounts and including,
  an input check unit,
  an integrated system of sequentially operative gates and pulse generating means for routing the items of information as coded pulses to appropriate storing devices,
  a plurality of count registering and storing circuits each arranged to register and store a count of more than one of said items and responsive to said pulses for registering and storing each count of said items;

a number of positions from which a plurality of said items are registered in said circuits and,
  an electronic scanner,
  means operatively associated with each of said positions and responsive to said scanner to emit a signal identifying one of said amounts,
  means responsive to said signal and said pulses to select at least one of said count circuits to receive said pulses and,
  verifier means responsive to said signal, said verifier means including,
  control count circuits arranged to register and store for verification the counts received at each digital position of the count registering and storing circuits representing one of said amounts and responsive to said pulses for registering and storing said count, said control count circuit being arranged to provide an output voltage on one of a number of terminals, each corresponding to one amount that can be selected,
  a set of amount terminals, each representing an amount which may be selected, said set of terminals having a voltage signal on only one terminal corresponding to the selected amount,
  first logic circuit means responsive to the voltage from the control counter circuit output terminals and the voltage at one of said amount terminals for delivering a signal to an "and" circuit when a voltage is present on corresponding amount terminals in both sets of terminals,
  second logic circuits means including an "and" circuit responsive to the said signal and the signals from at least one other source to deliver an output signal from the verifier if all prescribed signals are present,
  third logic circuit means to provide a warning signal, if the control counter output voltage is present on a terminal other than the one corresponding to the selected amount, or if all prescribed voltages are not present at said "and" circuit of said second logic circuit means.

2. A data handling system for automatically processing items of information, including betting amount, object and pool items, which system comprises in combination:
  a plurality of input units at which said items are received for processing, each input unit being adapted for emitting amount, object and pool identification voltages and a gate signal;
  a control unit for each of said input units, each of said control units being adapted to receive a gate signal from said input unit;
  an electronic scanner including a stepping circuit, said scanner being adapted to emit code signals representing a certain number;
  first means in each of said control units responsive to a specific code combination signal from said scanner representing a certain number to actuate said stepping circuit;
  second means in each of said control units responsive to said scanner code signal and to said gate signal to transmit an identification signal and a trigger pulse;
  verifier means responsive to the amount identification signal from the input unit and the digital information present at the input terminals of registering and storing devices, said verifier means including;
  a control counter adapted to receive the same pulses as the count registering and storing circuits and logic circuitry providing an output signal if the amount information registered is correct;
  third means in each control unit responsive to said output signal from the scanner to deliver a signal to the input device, actuating a printing mechanism, and a second signal to actuate said stepping circuit;
  a plurality of count registering and storing circuits each arranged to register and store a count of more than one of said amount items and responsive to said code pulses for registering and storing each count of said amount items, said count circuits also arranged in preselected groups including a pool group for registering and storing a count of said amount items in each pool and an object group for each pool for registering and storing a count of said amount items for each object in each pool;

means in each said one of the input units responsive to one said each control unit identification gate signal to transmit a voltage signal on one of several amount leads, each of said amount leads representing one specified amount;

an amount encoder converting the amount (denomination) identification voltage to coded digital form transmitting said signal to at least one of said count circuits in each of said preselected groups and to said control counter at the verifier;

input checking means responsive to the object, pool and betting amount voltages and the trigger pulse from the said control units to provide an output signal only if one lead in each object, pool and amount groups of leads is carrying a signal;

distribution means responsive to the output signal of the input check means, for said pool, said object and said amount identification signals, said distribution means being arranged to transmit a signal to one of several amount leads connected to said encoder and to also transmit signals to operate the input gates of at least one of said count circuits in each of said preselected groups and said control counter.

3. The system of claim 2 wherein each of said count circuits are arranged to provide count indicating output voltages, said system further comprising, in combination:

calculating means responsive to said output voltages to periodically compute ratios between at least one said count and another said count.

4. The system of claim 3 and which further comprises, in combination:

at least one display panel adapted to periodically display numbers indicating at least one said count and said ratios; and, means responsive to said output voltages and to said calculating means to actuate said panel.

5. The system of claim 4 and which further comprises, in combination:

printing means responsive to said output voltages to periodically print records of at least one said count.

6. The system of claim 5 and which further comprises, in combination:

printing means responsive to said calculating means to periodically print records of said ratios.

7. The system of claim 5 and which further comprises, in combination:

at least one auxiliary count registering and storing circuit having means responsive to said pulses to register, store and display each count of at least one of said items.

8. The system of claim 2 which further comprises in combination:

at least one magnetic tape recorder having associated electronic circuits and electrical print out means required for storing in digital form on the tape, items of information brought into the system, said magnetic tape recorder also being provided with means for replay, decoding and sorting the items of information, whereby specified items of information may on demand be extracted from the recording and printed on paper.

9. The system of claim 8 which further comprises in combination:

a digital computer responsive to information stored in the counting circuits as well as complementary data, programmed to perform digital calculations required for certain purposes, such as computing a ratio between at least two numbers contained in two different counting circuits, said computer being provided with means for printing out the various steps of the calculations as well as the final result.

10. The system of claim 9 which further comprises in combination:

a second digital computer arranged for storing the calculated results from a first digital computer, said second digital computer being provided with means for storing a large amount of information over a long period of time and means for printing out on paper on demand the information contained in the storing means or selected parts thereof, said second computer also being arranged to perform prescribed calculations.

References Cited

UNITED STATES PATENTS

| | | | |
|---|---|---|---|
| 2,605,967 | 8/1952 | Stone | 235—92 |
| 2,987,250 | 6/1961 | Faulkner | 235—92 |
| 3,047,223 | 7/1962 | Lange | 235—92 |
| 3,061,192 | 10/1962 | Terzian | 235—157 |
| 3,124,674 | 3/1964 | Edwards et al. | 340—172.5 |

ROBERT C. BAILEY, *Primary Examiner.*

MALCOLM A. MORRISON, E. M. RONEY, M. LISS, G. D. SHAW, *Assistant Examiners.*